UNITED STATES PATENT OFFICE.

CARL IMMERHEISER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

COLORING-MATTER LAKE.

No. 863,396.

Specification of Letters Patent.

Patented Aug. 13, 1907.

Application filed May 14, 1907. Serial No. 373,631.

*To all whom it may concern:*

Be it known that I, CARL IMMERHEISER, doctor of philosophy and chemist, a subject of the King of Bavaria, residing at Ludwigshafen-on-the-Rhine, Germany, have invented new and useful Improvements in Coloring-Matter Lakes, of which the following is a specification.

My invention relates to the production of coloring matter lakes. Although the azo coloring matters obtainable from amido-azobenzene disulfonic acid and naphthol sulfonic acids yield lakes which are very fast against the action of light, the coloring matter lakes which have hitherto been prepared from the corresponding coloring matters obtainable from amidoazobenzene and from amidoazobenzene monosulfonic acid are not sufficiently fast against the action of light to admit of their being used commercially. This is particularly emphasized in German Patent No. 154,533. I have now discovered that the statements contained in the said patent are not correct to such a general degree, but that the coloring matters obtainable by combining diazotized amidoazobenzene, or amidoazotoluene, with 1-naphthol-4-sulfonic acid yield lakes which possess an excellent fastness against the action of light and in this respect surpass even the lakes obtainable from amidoazobenzene disulfonic acid and 1.4-naphthol sulfonic acid. For the purposes of this invention amidoazobenzene and anilin are equivalent to amidoazotoluene and toluidin respectively. My new lakes possess a red color and are fast against the action of light and upon reduction with tin and hydrochloric acid yield 2-amido-1-naphthol-4-sulfonic acid. p-phenylenediamin and anilin.

The following example will serve to illustrate further the nature of my invention and now it can be carried into practical effect, but my invention is not confined to this example. The parts are by weight. Add, while stirring, an aqueous solution, or suspension of five (5) parts of the coloring matter obtainable by combining diazotized amidoazobenzene, or amidoazotoluene, with 1-naphthol-4-sulfonic acid, to a paste of aluminum hydrate which has been prepared from an aqueous solution of ten (10) parts of aluminum sulfate and five (5) parts of sodium carbonate. Then precipitate the mixture so obtained either while cold or hot with about seventeen (17) parts of barium chlorid in the form of a ten (10) per cent. solution. Filter off the precipitate, if necessary wash, and either dry it, or use it in the form of paste.

Instead of the process above described, other processes used in the manufacture of lakes can be employed and during the manufacture, or subsequently, Turkey red oil, glycerin, or other suitable substance, can be added. Of course, if desired, the preparation of the coloring matter can be made to take place simultaneously with the production of the lake.

Now what I claim is:

As new articles of manufacture coloring matter lakes obtainable by converting azobenzene-azo-1-naphthol-4-sulfonic acid into an insoluble salt thereof which lakes possess a red color, are fast against the action of light and upon reduction by means of tin and hydrochloric acid yield 2-amido-1-naphthol-4-sulfonic acid, para-phenylenediamin, and anilin.

In testimony whereof I have hereunto set my hand in the presence of two subscribing witnesses.

CARL IMMERHEISER.

Witnesses:
J. ALEC. LLOYD,
JOS. H. LEUTE.